A. W. SAEGESSER.
AUTOMOBILE LOCK FOR DISK WHEELS.
APPLICATION FILED FEB. 9, 1920.

1,348,960.

Patented Aug. 10, 1920.

Inventor
Albert W. Saegesser
By
Attorney

UNITED STATES PATENT OFFICE.

ALBERT W. SAEGESSER, OF GRANITE CITY, ILLINOIS, ASSIGNOR TO LIBERTY AUTO LOCK CO., OF ST. LOUIS, MISSOURI, A CORPORATION OF MISSOURI.

AUTOMOBILE-LOCK FOR DISK WHEELS.

1,348,960. Specification of Letters Patent. Patented Aug. 10, 1920.

Application filed February 9, 1920. Serial No. 357,159.

*To all whom it may concern:*

Be it known that I, ALBERT W. SAEGESSER, a citizen of the United States, residing at Granite City, in the county of Madison and State of Illinois, have invented certain new and useful Improvements in Automobile-Locks for Disk Wheels, of which the following is a specification.

This invention relates to certain new and useful improvements in automobile locks for disk wheels. The pecularities hereinafter will be described and claimed.

The main object of my invention is to provide a detachable lock for a disk wheel of an auto that will obstruct the ordinary movement of the car and thereby practically prevent the theft of the car, at the same time it allows of a movement of the car slowly a short distance in order to change its position slightly with regard to a hydrant or for other reasons required by the traffic laws.

Figure 1:
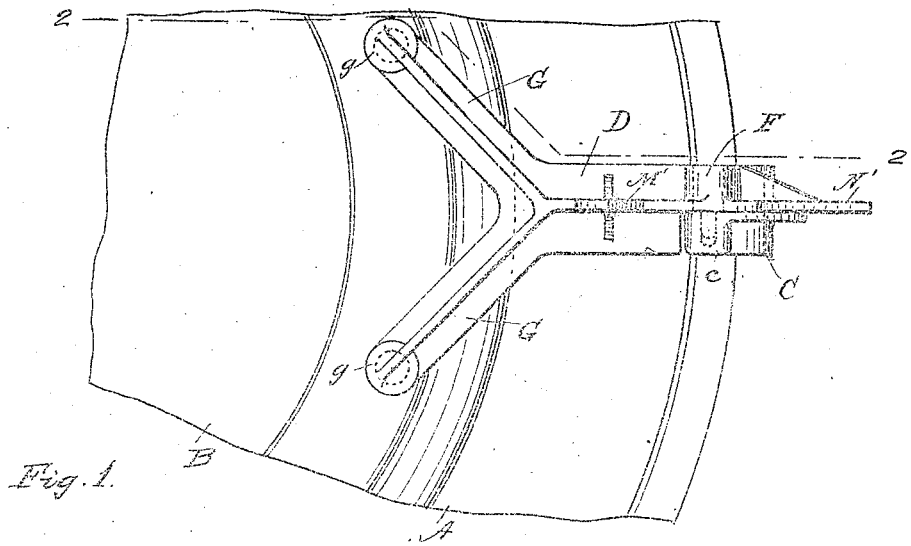
Figure 2:
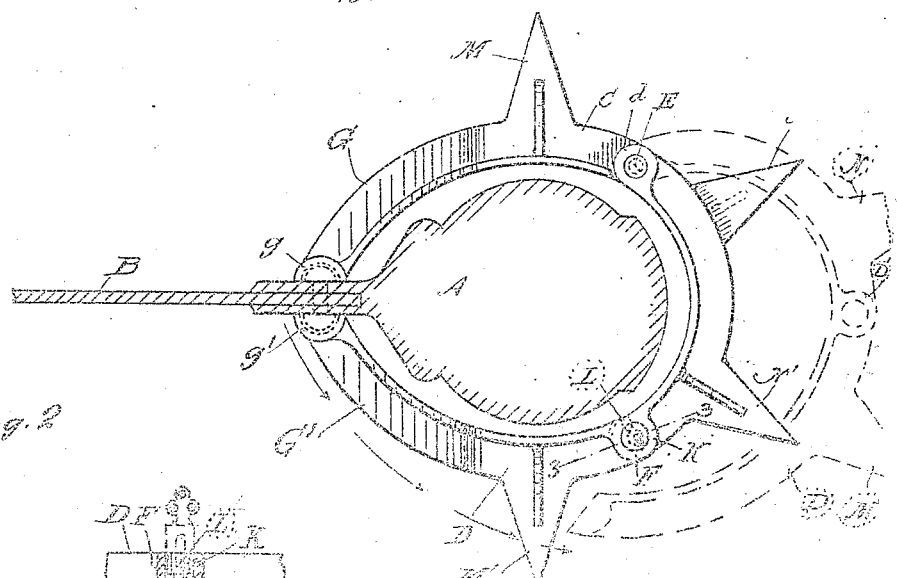

In the accompanying drawings on which like reference letters indicate corresponding parts, Figure 1 represents a side view of a portion of a disk wheel and an edge view of my device applied thereto; Fig. 2 a plan view of my locking device and section of the wheel on the line 2—2 of Fig. 1; and Fig. 3 a sectional detail on line 3—3 of the portion of the device containing the lock proper, or fastening means preferred for securing the jaw members in their locking position.

Figure 3:
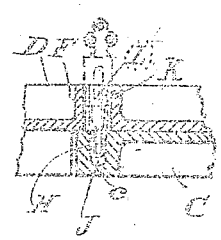

The letter A designates the tire casing and rim portions of an automobile wheel for instance, and B the disk portion forming the web of such a wheel. In other forms of wheels and wheel locks the openings between the spokes allow of attachment of a clamping piece encircling the tire. When a plate web is used as in the latest forms of automobile disk wheels, a lock that does not pass between the spokes or through the web must be employed. Herewith I show my preferred form of automobile lock for such a wheel and comprising two members C and D pivotally connected at one point such as E and having a locking connection at another point F by means of a lock proper or other suitable means, preferably key-operated, whereby the jaw members may be locked in the position indicated in Fig. 2, in which they are shown embracing the tire and rim portions A and practically in contact, by means of the ends of the jaws, with the web portion B. The ends of the jaws are preferably forked or divided laterally into Y-shaped prongs G—G' as shown in Fig. 2, to give each jaw a pair of separated points of engagement with the web of the wheel, in order that the clamping members may maintain their proper mounted position, practically radial, and resist any tendency to be brought flat against the tread of the wheel by any rotation of the wheel as would bring the lock in contact with the ground. In other words each prong being separated circumferentially from the opposite prong in one pair G—G, and also by the plate disk B from the opposite pair G' G', will form, with the outer portions of the clamp, a three-legged device in each member, that will act like a double tripod when properly attached to the wheel. At the same time the lock proper when opened, will allow the one member D to be thrown outward about the hinge or pivot E as indicated by dotted lines in Fig. 2, for removal from the wheel. Any suitable locking means at F may be employed, but the design shown in detail in Fig. 3, provides a bolt H in the lock proper that engages a recess or opening J in the other jaw member, that prevents movement of the jaw members when engaged, and forms a fixed divided ring that grips the said automobile wheel. Radiating points or projections are provided at suitable distance on the clamping jaws as shown in Fig. 2.

It will be observed that when the jaws are in locking position a continuous and symmetrical effect is obtained by the overlapping or doubling of the parts between the pivot E and the lock proper at F; the balance of the device is single and of any desired form in cross section. While the point E about which one of the jaws pivots, and the lock proper at F, are separated in the design shown in Fig. 2 substantially one third of the circumference, they may be otherwise located, nearer together or farther apart. In the position shown however they give a substantial bracing effect that prevents any ordinary endeavor being successful in separating the gripping ends of the jaws from engagement with the plate web of the wheel. The pivot E connects only one end *d* of the D-member with a point in the C member that is intermediate of its jaw prongs, and the boss end *c* fastened by the bolt of lock proper. Of course, the cylinder of the lock proper may be mounted on the boss end *c* and the recess for its bolt may be formed in the D member, which would simply be reversing the lock proper. The lock proper shown has a key-operated cylinder K that turns and pulls part way out of the boss F when disengaging the bolt H from the recess in the other member. A stop pin L on the inside where it is inaccessible in locked position, limits its withdrawal. Other suitable forms of lock proper may be used.

The ends of the prongs are preferably cupped or recessed at *g—g'* respectively, to engage projections of the plate or rim, such as the heads of rivets or bolts that fasten the rim and plate. The lock is thus clamped or fixed in one position when mounted on the wheel, and cannot move circumferentially. The prongs and body of the member C have a T-shape in cross section out to the pivot E, and the outer portion around to the end *c* is angular in cross section. Also the prongs and body of the matching member D have a T-form of section out to the boss F where the locking means is located, and the outer portion around to the end *d* is angular in cross section and matches the corresponding angle of the member C. The doubled outer angles form a T-section also, when in locking position. The leg of the T is preferably outside, and the head next to the tire and rim. Each member has a radiating projection M—M' from the side of the body portions C—D respectively, that are web braced to the head flange on both sides of the leg flange; and they also have similar projections N—N' respectively, on the outer doubled portions that are flat on one side and braced to the inner angle flange respectively, so as not to interfere with the lapped or doubled arrangement of the outer portions of said members, in opening the swinging member D to the dotted position, Fig. 2. The two members are preferably counterparts of each other, so that one pattern or die may be employed. Thus a strong, double braced key-controlled locking device is provided that can be readily attached to an automobile wheel or the like, especially a wheel with a plate web instead of spokes, and will practically prevent theft of the machine.

I claim:

1. A device of the character described comprising a pair of jaw members,—the ends of said jaws not meeting each other but forming a space for receiving the disk member of an automobile wheel,—a pivot connection in one member intermediate of the ends, and engaged to one end of the other member, a lock proper fastening one end of the other member to an intermediate point in the adjacent member,—said member overlapping each other between the pivot connection and the lock proper substantially as described.

2. A device of the character described comprising two jaw members having their inner opposing ends respectively forked and their outer ends overlapping each other, a pivot connection between the outer end of one member and the adjacent intermediate portion of the other member, and a key-controlled lock securing the outer end of the opposite member to the adjacent intermediate portion of the first named member, substantially as described.

3. A device of the character described comprising clamping members having their opposing jaw ends located on opposite sides of the disk web of a wheel when in locking position, radiating projections from said members, a pivotal connection between said members, and a locking device opposite to said pivotal connection forming a second connection between said members to prevent one member swinging open about said pivot when in locking position.

4. A device of the character described comprising two members pivotally connected and adapted to embrace the tire and rim of a disk wheel, and having opposing inner ends forked and recessed and adapted to engage lateral projections from each side of said wheel, substantially as described.

5. A device of the character described comprising two members the counter-part of each other having radiating projections and having clamping jaws at their opposing inner ends and overlapping one another at their outer ends, a pivot and locking means connecting the respective outer ends with the adjacent intermediate portions of said members, substantially as described.

6. A device of the character described comprising two members having radiating projections and having opposing forked and recessed inner ends and overlapping outer ends, a pivot and locking means connecting the respective outer ends with the adjacent intermediate portions of said members substantially as described.

7. A device of the character described comprising two members curved to embrace the tire and rim of a wheel and having opposing inner ends adapted for clamping engagement with the disk of said wheel, and outer ends overlapped and doubled and having outward projections in different planes,—said members being flanged and forming a T-cross section in both single and doubled portions of said device when in locking position,—and a pivot and locking means connecting the respective outer ends with the adjacent intermediate portions of the opposite member substantially as described.

In testimony whereof I have affixed my signature.

ALBERT W. SAEGESSER.